US008786566B2

(12) United States Patent
Okazaki

(10) Patent No.: US 8,786,566 B2
(45) Date of Patent: Jul. 22, 2014

(54) INFORMATION PROCESSING APPARATUS

(71) Applicant: Sony Corporation, Tokyo (JP)

(72) Inventor: Takashi Okazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/781,273

(22) Filed: Feb. 28, 2013

(65) Prior Publication Data

US 2013/0169578 A1 Jul. 4, 2013

Related U.S. Application Data

(63) Continuation of application No. 12/539,197, filed on Aug. 11, 2009, now Pat. No. 8,411,049.

(30) Foreign Application Priority Data

Aug. 12, 2008 (JP) ................................ 2008-207896

(51) Int. Cl.

| | |
|---|---|
| ***G06F 3/041*** | (2006.01) |
| ***G09G 3/36*** | (2006.01) |

(52) U.S. Cl.

USPC .......................................... 345/173; 345/102

(58) Field of Classification Search

USPC .......................................... 345/173, 102, 211

See application file for complete search history.

(56) References Cited

U.S. PATENT DOCUMENTS

| | | | |
|---|---|---|---|
| 2005/0017957 | A1 | 1/2005 | Yi |
| 2005/0035955 | A1 | 2/2005 | Carter et al. |
| 2008/0167071 | A1 | 7/2008 | Forstall et al. |

FOREIGN PATENT DOCUMENTS

| | | |
|---|---|---|
| JP | 9-43666 | 2/1997 |
| JP | 2000-201205 | 7/2000 |
| JP | 2000-267685 | 9/2000 |
| JP | 2001-59984 | 3/2001 |
| JP | 2006-279769 | 10/2006 |

OTHER PUBLICATIONS

Office Action issued Jun. 26, 2012 in Japanese Patent Application No. 2008-207896.

*Primary Examiner* — Kevin M Nguyen

(74) *Attorney, Agent, or Firm* — Oblon, Spivak, McClelland, Maier & Neustadt, L.L.P.

(57) ABSTRACT

An information processing apparatus includes a display control unit that causes a display unit having a display screen to perform information display; a switching unit that performs switching between a touch input enable state, in which predetermined processing is performed in response to touch input, and a touch input disable state, in which the predetermined processing is not performed even when touch input is detected; and a detector that is disposed at a position different from a position of the touch position detector and that performs predetermined detection. The display unit can be switched between an inactive state and an active state. The switching unit includes a first controller that sets the touch input disable state when the display unit enters the inactive state, and a second controller that performs switching to the touch input enable state in accordance with the result of the predetermined detection.

6 Claims, 10 Drawing Sheets

1A,1B,1C

| | POSITION OF BACK SIDE MONITOR | |
|---|---|---|
| | BASIC POSITION | INCLINED POSITION |
| BACK SIDE MONITOR POWER OFF | DISABLE TOUCH PANEL INPUT | ENABLE TOUCH PANEL INPUT |
| BACK LIGHT OFF | DISABLE TOUCH PANEL INPUT | ENABLE TOUCH PANEL INPUT |

INFORMATION PROCESSING APPARATUS

CROSS-REFERENCE TO RELATED APPLICATIONS

This application is a continuation of U.S. application Ser. No. 12/539,197, filed Aug. 11, 2009, and is based upon and claims the benefit of priority from prior Japanese Patent Application No. 2008-207896, filed Aug. 12, 2008. The entire contents of each of the above-listed applications are incorporated herein by reference.

BACKGROUND OF THE INVENTION

1. Field of the Invention

The present invention relates to an information processing apparatus including display control means that causes display means to perform information display.

2. Description of the Related Art

Digital cameras and other image pickup apparatuses (information processing apparatuses) are often equipped with touch panels disposed on their monitors, which are used as input devices for users. By using a touch panel, operation buttons and the like can be displayed in comparatively large sizes on a monitor, and a user can perform an input operation by softly touching the touch panel with a fingertip, which provides excellent operability.

However, if a touch panel is disposed on a back side monitor of an image pickup apparatus, when a user looks through an optical viewfinder, his/her nose may contact the touch panel, which may cause an unintended input.

In order to prevent such trouble, for example, Japanese Unexamined Patent Application Publication No. 09-43666 discloses a technique for an image pickup apparatus. To prevent unintended input, the image pickup apparatus includes a specific operation member disposed in a position different from the position of a touch panel and accepts touch panel input by a user only when the user operates the operation member.

However, with an image pickup apparatus according to Japanese Unexamined Patent Application Publication No. 09-43666, when a user wants to perform touch panel input, the user has to operate the specific operation member as well as perform input using the touch panel, which is burdensome and inconvenient for the user.

In order to reduce burden on a user, an image pickup apparatus disclosed in Japanese Unexamined Patent Application Publication No. 2001-59984 includes a viewfinder having an eye detector that detects whether a user's eye is close to the viewfinder, and disables touch panel input when the eye detector detects an eye.

SUMMARY OF THE INVENTION

However, since the image pickup apparatus disclosed in Japanese Unexamined Patent Application Publication No. 2001-59984 disables touch panel input only when the eye detector detects a user's eye, if, for example, a user happens to touch a touch panel (touch position detector) with his/her finger when his/her eye is not detected, unintended input may not be appropriately suppressed.

It is desirable to provide an information processing apparatus that appropriately suppresses unintended input to a touch position detector.

An information processing apparatus according to an embodiment of the present invention includes display control means that causes display means having a display screen to perform information display; switching means that performs switching between a touch input enable state and a touch input disable state, the touch input enable state being a state in which predetermined processing is performed in response to touch input to a touch position detector disposed on the display screen so as to detect a touch position, the touch input disable state being a state in which the predetermined processing is not performed even when touch input to the touch position detector is detected; and a detector that detects a predetermines state, the detector being disposed at a position different from a position of the touch position detector, wherein the display means is capable of being switched between an inactive state and an active state regarding the information display, and wherein the switching means includes first control means that sets the touch input disable state when the display means enters the inactive state, and second control means that performs switching to the touch input enable state when the detector detects the predetermined state in the touch input disable state set by the first control means.

An information processing apparatus according to an embodiment of the invention includes display control means that causes display means including a display screen to perform information display; switching means that performs switching between a touch input enable state and a touch input disable state, the touch input enable state being a state in which predetermined processing is performed in response to touch input to a touch position detector that is disposed on the display screen and that detects a touch position, the touch input disable state being a state in which the predetermined processing is not performed even when touch input is performed; and input means that receives operation input, wherein the switching means includes control means that performs switching between the touch input enable state and the touch input disable state on the basis of information of switching condition stored in predetermined storage means, and condition setting means that sets the switching condition on the basis of the operation input to the input means.

An information processing apparatus according to an embodiment of the invention includes display control means that causes display means including a display screen to perform information display; and switching means that performs switching between a touch input enable state and a touch input disable state, the touch input enable state being a state in which predetermined processing is performed in response to touch input to a touch position detector that is disposed on the display screen and that detects a touch position, the touch input disable state being a state in which the predetermined processing is not performed even when touch input is performed, wherein the display means includes a position changing mechanism that allows changing of a position of the display screen, and position detection means that detect a position of the display screen, and wherein the switching means includes control means that performs switching between the touch input enable state and the touch input disable state in accordance with the position of the display screen detected by the position detection means.

With an embodiment of the present invention, when the display means is in an inactive state, touch input to the touch position detector on the display screen is set to a touch input disable state, and, when the detector, which is disposed in a position different from the position of the touch position detector, detects the predetermined state in the touch input disable state, touch input is switched to a touch input enable state. As a result, unintended input to the touch position detector can be appropriately suppressed.

With an embodiment of the present invention, since switching conditions for switching between a touch input enable state and a touch input disable state of the touch position detector are set on the basis of operation input to the input means. Thus, unintended input to the touch position detector can be appropriately suppressed.

With an embodiment of the present invention, a touch input enable state and a touch input disable state of the touch position detector on the display screen can be switched therebetween in accordance with the position of the display screen. Thus, unintended input to the touch position detector can be appropriately suppressed.

DESCRIPTION OF THE PREFERRED EMBODIMENTS

First Embodiment

Structure of Image Pickup Apparatus

Figure 1:
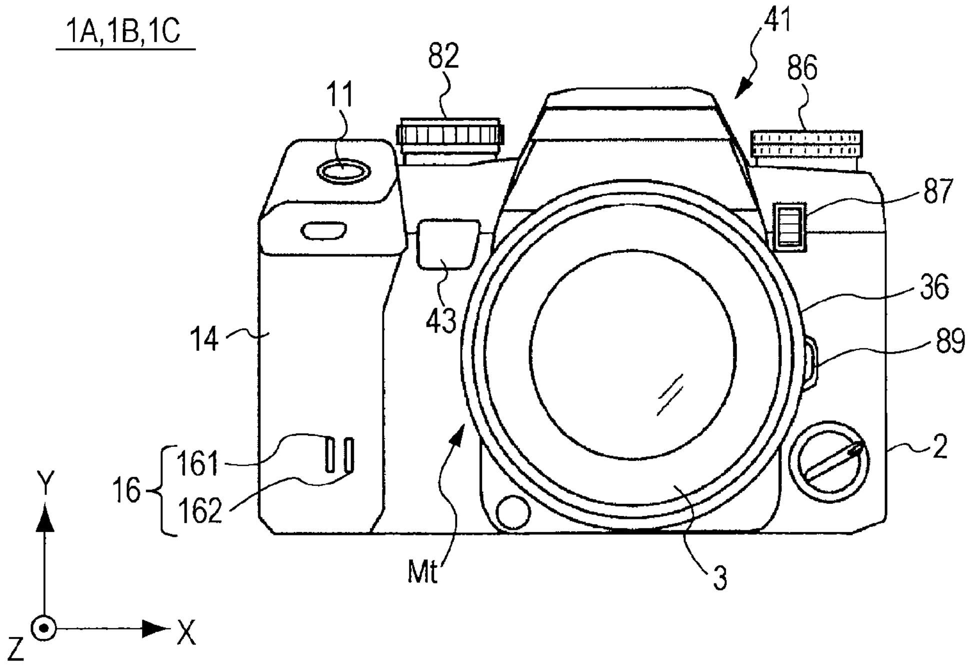
FIG. 1 shows an external structure of an image pickup apparatus according to a first embodiment of the present invention.
Figure 2:
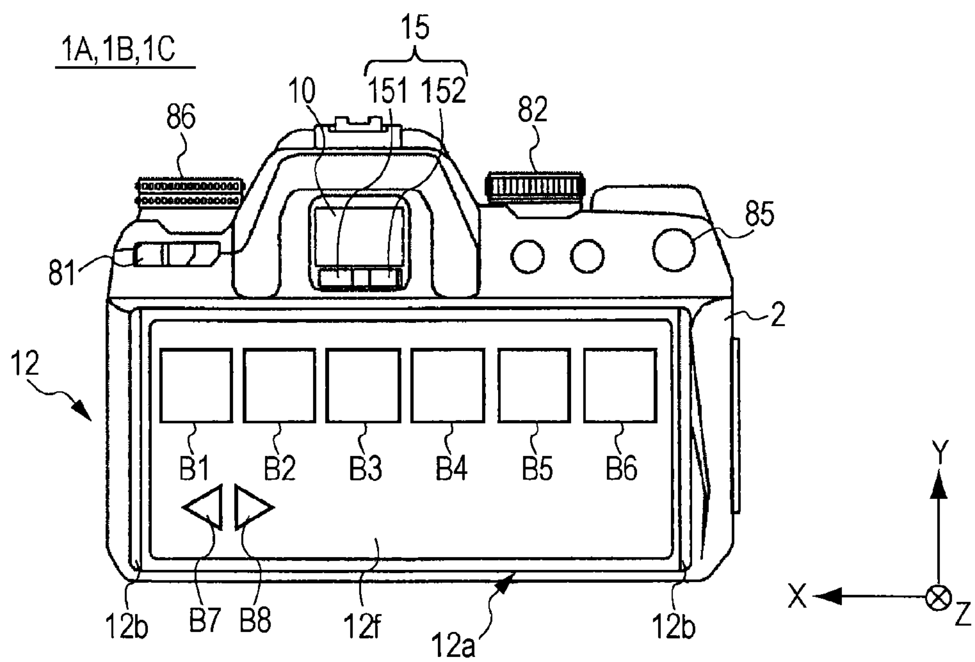
FIG. 2 shows an external structure of the image pickup apparatus.

FIGS. 1 and 2 show the external structure of an image pickup apparatus 1A according to a first embodiment of the present invention. FIG. 1 is a front external view of the image pickup apparatus 1A, and FIG. 2 is a rear external view of the image pickup apparatus 1A. The image pickup apparatus 1A is a lens interchangeable single lens reflex digital camera, which functions as a portable information processing apparatus.

As shown in FIG. 1, the image pickup apparatus 1A includes a camera body 2. An interchangeable lens unit 3 can be mounted on and dismounted from the camera body 2.

The interchangeable lens unit 3 includes a lens barrel 36, and lenses 37 (see FIG. 5) and a diaphragm 19 (see FIG. 5) disposed in the lens barrel 36. The lenses 37, which allow a user to change an optical zoom ratio, include a focus lens that changes a focal position by being moved along the optical axis.

The camera body 2 has an annular mount portion Mt, on which the interchangeable lens unit 3 is mounted, at substantially the center of the front side thereof. The camera body 2 also has a lens release button 89 near the annular mount portion Mt. The lens release button 89 is used for mounting/dismounting the interchangeable lens unit 3.

The camera body 2 has a mode setting dial 82 in a front upper left portion thereof, and a control dial 86 in a front upper right portion. By turning the mode setting dial 82, a user can perform a setting operation (switching operation) for changing modes of the camera including shooting modes (portrait mode, landscape mode, full-auto mode, etc.), a playback mode for playing back taken images, and a setting mode for performing various setting of the image pickup apparatus 1A. By turning the control dial 86, a user can set control values for shooting modes.

The camera body 2 has a grip 14, which allows a user to hold the camera body 2, in a front left end portion thereof. The grip 14 includes a grip detector 16 that detects whether a user holds the grip (specific portion) 14 of the image pickup apparatus 1A by using, as an eye detector 15 described below, a light-emitting device 161 and a light-receiving device 162.

On the upper side of the grip 14, a release button 11 for instructing the image pickup apparatus 1A to start an exposure operation is disposed. The grip 14 has a battery space and a memory card space therein. A power source for the camera, such as a battery, is disposed in the battery space. A memory card 90 (see FIG. 5), for storing data for taken images, can be detachably installed in the memory card space.

The release button 11 is a two-stage detection button capable of detecting two states including a half depressed state (state S1) and a fully depressed state (state S2). When the release button 11 is half depressed and becomes to be in the state S1, preliminary operations, such as an AF control operation and an AE control operation, before capturing still images of an object to be recorded (actual shooting images) are performed. When the release button 11 is depressed further and becomes to be in the state S2, an image pickup operation for capturing actual shooting images is performed. The image pickup operation includes a series of operations for exposing an object image (optical image) using an image pickup device 5 (described below) and for applying predetermined image processing to an image signal obtained by the exposure.

As shown in FIG. 2, a viewfinder window (eyepiece) 10 is disposed in substantially the upper middle portion of the camera body 2. By looking through the viewfinder window 10, a user can watch an optical image of an object guided through the interchangeable lens unit 3 so as to set the composition. That is, by using an optical viewfinder that guides an optical image of an object, which has passed through the interchangeable lens unit 3, to the viewfinder window 10, a user can perform a composition setting operation (described in detail below).

The eye detector 15 is disposed under the viewfinder window 10. The eye detector includes a light-emitting device 151, which emits infrared light, and a light-receiving device 152. The eye detector 15 emits light from the light-emitting device 151, such as an LED, and attempts to detect reflection light from a user's eye with the light-receiving device 152. If the reflection light is detected, the eye detector 15 determines that the eye is close to the viewfinder window 10 (eye detection is thus performed).

With the image pickup apparatus 1A, a user can use live images (preview images), which are displayed on a back side monitor 12 (described below), so as to set the composition before actual shooting. By turning a switching dial 87, a user can switch between a composition setting operation using an optical viewfinder and a composition setting operation using a live view display. This switching operation is described in detail below.

As shown in FIG. 2, the back side monitor 12 is movably disposed on the back side of the camera body 2. The back side monitor 12 includes a monitor body 12*a* and two connection members (linking members) 12*b*. The monitor body 12*a* includes a display screen 12*f* having, for example, a color liquid-crystal display. The monitor body 12*a* can be switched between an inactive state and an operating state (active state) regarding information display of images, characters, and the like. The connection members 12*b* are rotatably connected to the monitor body 12*a*. On the back side monitor 12, a menu screen for setting an image pickup condition can be displayed, and images stored in the memory card 90 can be played back in a playback mode. Moreover, on the back side monitor 12, live view display of time-series images (moving images) captured by an image pickup device 7 (described below) can be performed.

Figure 3A:
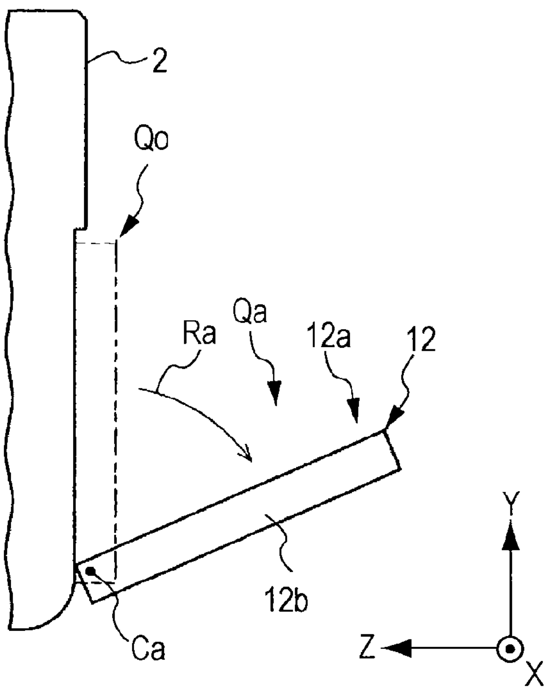
FIGS. 3A and 3B are explanatory views showing how the position of a monitor body can be changed.

The back side monitor 12 includes a position change mechanism in that the monitor body 12*a* is rotatably supported between the connection members 12*b* so that the position of the display screen 12*f* can be changed. Referring to FIG. 3A, how the position of the monitor body 12*a* can be changed is described.

Figure 3B:
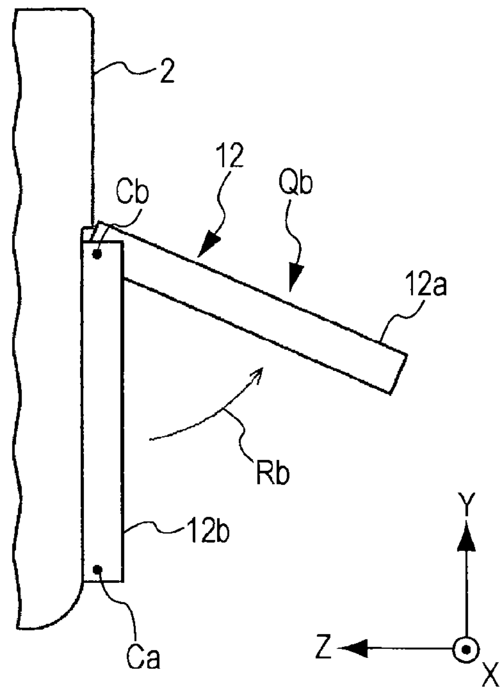

FIGS. 3A and 3B are explanatory views showing how the position of the monitor body 12*a* can be changed. FIG. 3A and FIG. 3B show side views of a rear part of the image pickup apparatus 1A.

Figure 4A:
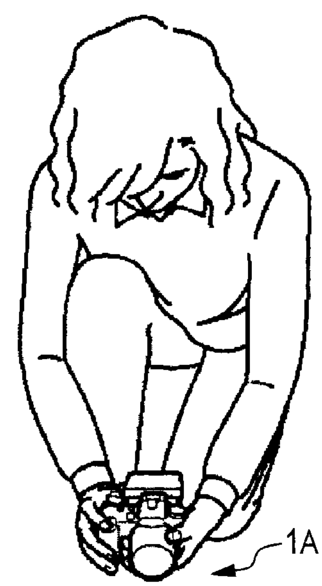
FIGS. 4A and 4B are explanatory views showing how the position of a monitor body can be changed.
Figure 4B:
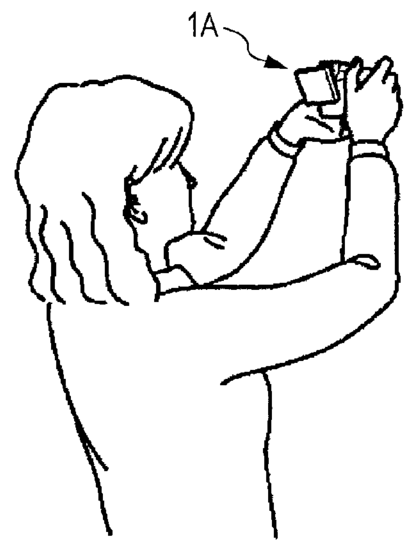

An end of each of the connection members 12*b* of the back side monitor 12 is rotatably connected to a back bottom portion of the camera body 2 via a rotation shaft Ca. The other end of each of the connection members 12*b* is rotatably connected to an upper end portion of the monitor body 12*a* via a rotation shaft Cb. Since the back side monitor 12 has this structure, the back side monitor 12 can take the following three positions: a normal position Qo (shown by the broken line in FIG. 3A) at which the monitor body 12*a* contacts the outer surface of the camera body 2 in an upright position, an inclined position Qa at which the monitor body 12*a* is inclined in a downward direction Ra, and an inclined position Qb at which the monitor body 12*a* is inclined in an upward direction Rb as shown in FIG. 3B. Thus, a user can perform, for example, low-angle shooting as shown in FIG. 4A and high-angle shooting as shown in FIG. 4B with the image pickup apparatus 1A.

Referring back to FIGS. 1 and 2, the image pickup apparatus is described further.

A main switch 81 is disposed in an upper left portion on the back of the camera body 2. The main switch 81 is a two-position slide switch. When the contact of the slide switch is in the "OFF" position on the left, the power is off, and when the contact is in the "ON" position on the right, the power is on.

A playback button 85 is disposed in an upper right portion on the back of the camera body 2. The playback button 85 receives an instruction to change the image pickup apparatus 1A to a playback mode. When the playback button 85 is depressed in a shooting mode, the image pickup apparatus 1A is changed to a playback mode and taken images are displayed on the back side monitor 12.

Figure 5:
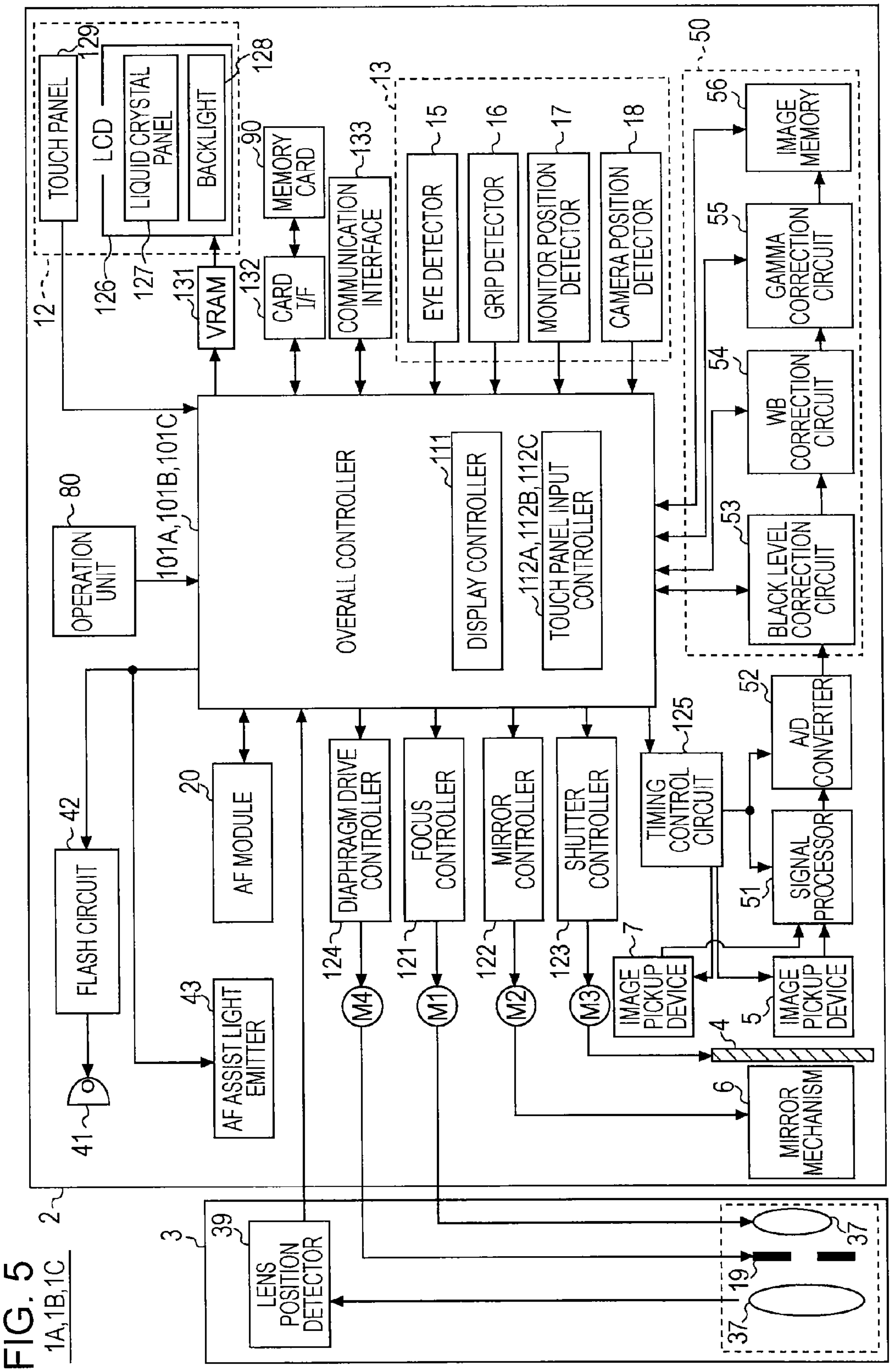
FIG. 5 is a functional block diagram of the image pickup apparatus.

Referring to FIG. 5, an outline of functions of the image pickup apparatus 1A is described. FIG. 5 is a block diagram of the functional structure of the image pickup apparatus 1A.

As shown in FIG. 5, the image pickup apparatus 1A includes an operation section 80, an overall controller 101A, a focus controller 121, a mirror controller 122, a shutter controller 123, a diaphragm drive controller 124, a timing controller 125, and a digital signal processor 50.

The operation section 80 includes operation members, which actually are buttons and switches disposed on the image pickup apparatus 1A, such as the release button 11 (see FIG. 1). The operation members are capable of detecting operation input performed by a user. In response to user input to the operation section 80, the overall controller 101A performs various operations.

The overall controller 101A includes a microcomputer including a storage section having a flash memory that temporarily stores data, a ROM that stores a control program, and the like. The overall controller 101A controls operations of various units included in the image pickup apparatus 1A. The overall controller 101A includes functions of a display controller 111 and a touch panel input controller 112A.

The display controller ill causes the back side monitor 12 to perform information display of taken images and a menu screen for setting an image pickup condition and the like.

In response to touch input on a touch panel 129 described below, the touch panel input controller 112A performs switching between a touch input enable state and a touch input disable state. In the touch panel input enable state, processing operations allocated, for example, to buttons B1 to B8 (FIG. 2) displayed on the back side monitor 12 are performed. In the touch input disable state, the processing operations allocated to the buttons are not performed even when a user performs touch input. The touch panel input controller 112A can be implemented in software by making a microcomputer of the overall controller 101A execute a control program stored in a ROM. A control program may be stored in the memory card 90 and then installed in a ROM of the overall controller 101A so as to control the image pickup apparatus 1A.

The focus controller 121 generates a control signal on the basis of a signal that is input from the overall controller 101A so as to drive a motor M1 and move a focus lens included in the lenses 37 of the interchangeable lens unit 3. The position of the focus lens is detected by a lens position detector 39 of the interchangeable lens unit 3, and data for the position of the focus lens is supplied to the overall controller 101A. Thus, the focus controller 121 and the overall controller 101A, among others, control the movement of the focus lens along the optical axis.

The mirror controller 122 performs switching between a mirror-up state in which a mirror mechanism 6 is retracted from a light path and a mirror-down state in which the mirror mechanism 6 blocks the light path. The mirror controller 122 generates a control signal on the basis of a signal that is input from the overall controller 101A so as to drive a motor M2 and thereby perform switching between the mirror-up state and the mirror-down state.

The shutter controller 123 generates a control signal on the basis of a signal that is input from the overall controller 101A so as to drive a motor M3 and control opening/closing of a shutter 4.

The diaphragm drive controller 124 generates a control signal on the basis of a signal that is input from the overall controller 101A so as to drive a motor M4 and control the aperture diameter of the diaphragm 19 disposed in the interchangeable lens unit 3.

In actual shooting, the diaphragm drive controller 124 (and the overall controller 101A) adjusts the diaphragm 19 to an aperture determined by an AE control operation so that images can be taken with an appropriate exposure (and focus).

The timing controller 125 performs timing control of the image pickup device 5 and the like.

The image pickup device 5 (for example, a CMOS sensor) transforms an optical image of an object received through the lenses 37 to an electric signal by photoelectric conversion so as to generate an image signal of an actual shooting image (image signal for recording). The image pickup device 5 can be described as an image pickup device for capturing images for recording.

The image pickup device 5, in response to drive control signals (an accumulation start signal and an accumulation end signal) input from the timing controller 125, performs exposure (accumulates charges by photoelectric conversion) of an object image formed on a light-receiving surface so as to generate an image signal of the object image. The image pickup device 5, in response to a read control signal that has been input from the timing controller 125, outputs the image signal to a signal processor 51. A timing signal (synchronizing signal) from the timing controller 125 is input to the signal processor 51 and an A/D converter 52.

An image signal captured by the image pickup device 5 is subjected to analog signal processing, such as auto gain control (AGC), by the signal processor 51. After the analog signal processing, the image signal is converted to digital image data (image data) by the A/D converter 52. The image data is input to the digital signal processor 50.

The digital signal processor 50 applies digital signal processing to the image data input from the A/D converter 52 so as to generate image data for taken images. The digital signal processor 50 includes a black level collection circuit 53, a white balance circuit 54, a gamma correction circuit 55, and an image memory 56.

The black level collection circuit 53 adjusts the black level of pixel data, which constitute image data that has been output from the A/D converter 52, to a reference black level. The white balance circuit 54 adjusts the white balance of an image. The gamma correction circuit 55 changes the gradation of an image. The image memory 56 is a high-speed image memory for temporarily storing generated image data. The image memory 56 has a capacity for storing image data of a plurality of frames.

In actual shooting, image data is temporarily stored in the image memory 56, subjected to image processing (compression, etc.) by the overall controller 101A as necessary, and then stored in the memory card 90 through a card I/F 132.

Image data is temporarily stored in the image memory 56, and, as necessary, the overall controller 101A transfers the image data to a VRAM 131 so as to display, on the back side monitor 12, an image based on the image data. Thus, a confirmation display (after-view display) for checking taken images and a playback display for playing back taken images are provided.

The image pickup apparatus 1A further includes the image pickup device 7 (see also FIG. 4), which is different from the image pickup device 5. The image pickup device 7 serves as an image pickup device for capturing so-called live images (image pickup device for an electronic viewfinder).

The image pickup device 7 has a structure similar to that of the image pickup device 5. Regarding resolution, it is sufficient that the image pickup device 7 has a resolution for generating a live view image signal (moving image signal), and the image pickup device 7 typically has less pixels than the image pickup device 5.

An image signal captured by the image pickup device 7 is subjected to signal processing similar to that for the image signal captured by the image pickup device 5. An image signal captured by the image pickup device 7 is subjected to predetermined processing by the signal processor 51, converted to digital data by the A/D converter 52, subjected to predetermined image processing by the digital signal processor 50, and stored in the image memory 56.

Time-series image data that has been captured by the image pickup device 7 and stored in the image memory 56 are successively transferred to the VRAM 131 by the overall controller 101A, so that an image based on the time-series image data can be displayed on the back side monitor 12. That is, an electric viewfinder is realized, with which image display on the back side monitor 12 is performed using images successively generated by the image pickup device 7 before actual shooting. Thus, moving images are displayed (live view display is performed) so that a user can set the composition.

In the back side monitor 12, the monitor body 12*a* includes a liquid crystal display (LCD) 126, which performs after-view display and live view display as described above, and a transparent touch panel 129 disposed on the LCD 126.

The LCD 126 includes a liquid crystal panel 127 that constitutes the display screen 12*f* and a backlight 128 that illuminates the liquid crystal panel 127 from behind. The power for the LCD 126 and the backlight 128 can be turned off by an auto power off function or with a predetermined user operation. In a sleep mode initiated by auto power off, when a user operation is performed on one of the operation members of the operation section 80, the image pickup apparatus 1A wakes up and the power for the LCD 126 is turned on.

The touch panel 129 also serves as a touch position detector for detecting a position at which a user touched the display screen 12*f* of the back side monitor 12 so as to receive operation input by the user.

By using the back side monitor 12 having this structure, and by displaying, for example, the buttons B1 to B8 on the LCD 126 as shown in FIG. 2 and detecting touch operations performed on the buttons on the touch panel 129, a user operation on the buttons B1 to B8 can be detected. This allows user input on the touch panel 129 (hereinafter referred to as "touch panel input") to affect the operation of the image pickup apparatus 1A. However, if touch panel input is always enabled, when, for example, a user erroneously touches the touch panel 129, the image pickup apparatus 1A may perform an unintended operation. Therefore, in the image pickup apparatus 1A, the overall controller 101A (the touch panel input controller 112A thereof) exercises control such that touch panel input is disabled so that the touch panel input does not affect the operation of the image pickup apparatus 1A, when, for example, the back side monitor 12 is off or the backlight 128 is off (as described in detail below).

The image pickup apparatus 1A includes a detection unit 13 that includes the eye detector 15 and the grip detector 16, which are described above, so as to detect states and the like of the image pickup apparatus 1A. The detection unit 13 further includes a monitor position detector 17 for detecting the position of the display screen 12*f* relative to the monitor body 12*a* and a camera position sensor 18 for detecting the position of the camera body 2.

The monitor position detector 17 includes two sensors (not shown) such as rotary encoders. One of the sensors detects the rotation angle between the camera body 2 and the connection members 12*b* around the rotation shaft Ca as shown in FIG. 3A. The other one of the sensors detects the rotation angle between the monitor body 12*a* and the connection members 12*b* around the rotation shaft Cb as shown in FIG. 3B. These sensors allows detection of the position of the monitor body 12*a* relative to the camera body 2.

The camera position sensor 18 detects the inclination of the camera body 2 using, for example, a gyro sensor (not shown) disposed in the camera body 2.

The image pickup apparatus 1A includes a communication I/F 133 so as to perform data communication with a device (for example, a personal computer) that is connected through the communication interface 133.

The image pickup apparatus 1A further includes a flash 41, a flash controller 42, and an AF assist light emitter 43. The flash 41 is a light source that is used when the brightness of an object is insufficient. The flash controller 42 and the overall controller 101A, etc., determine whether to turn on the flash 41 and how long the flash 41 is turned on. The AF assist light emitter 43 is an auxiliary light source for auto focus. The overall controller 101A, for example, determines whether to turn on the AF assist light emitter 43 and how long the AF assist light emitter 43 is turned on.

Composition Setting Operation (Framing Operation) with Image Pickup Apparatus 1A Next, a composition setting operation (framing operation) with the image pickup apparatus 1A is described. As described above, with the image pickup apparatus 1A, a user can set a composition using an optical viewfinder (by framing) or using live images displayed on the back side monitor 12 (using an electronic viewfinder).

As described below, by turning the switching dial 87 (FIG. 1), a user can select whether to use an optical viewfinder (OVF) or an electronic viewfinder (EVF) so as to set the composition.

Figure 6:
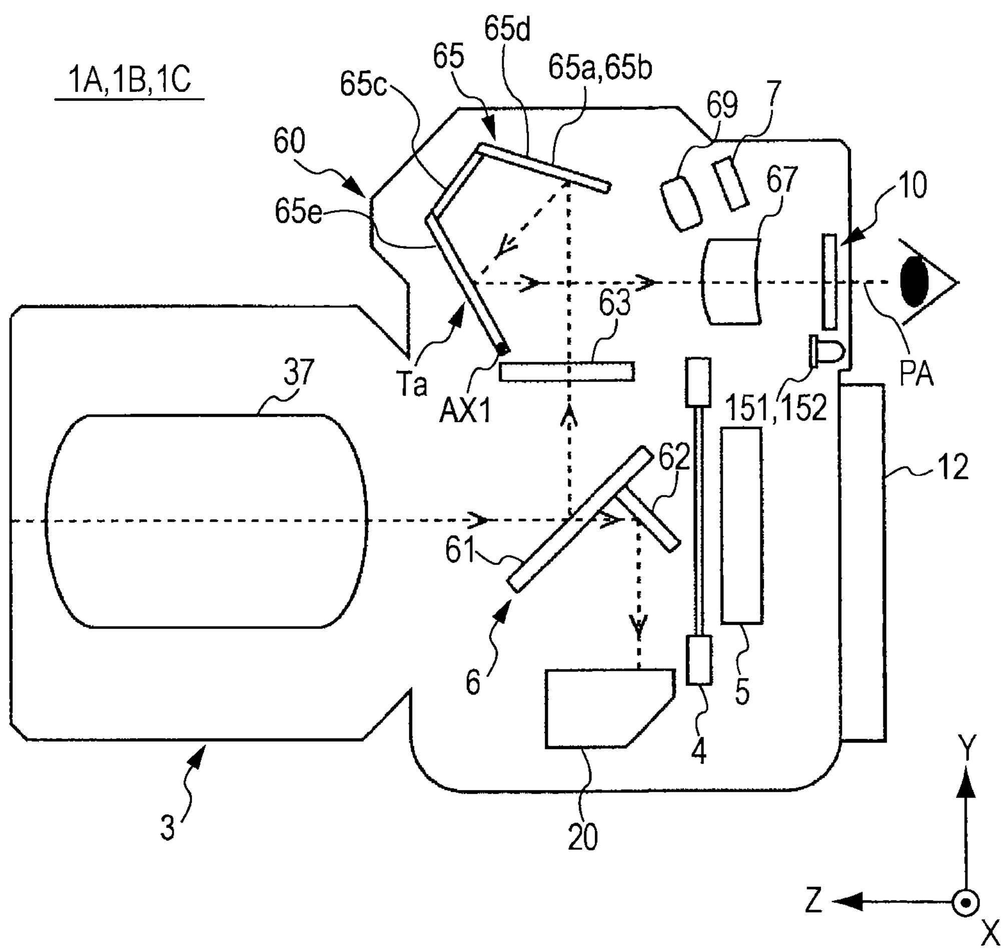
FIG. 6 is a sectional view showing composition setting operation using an optical viewfinder.
Figure 7:
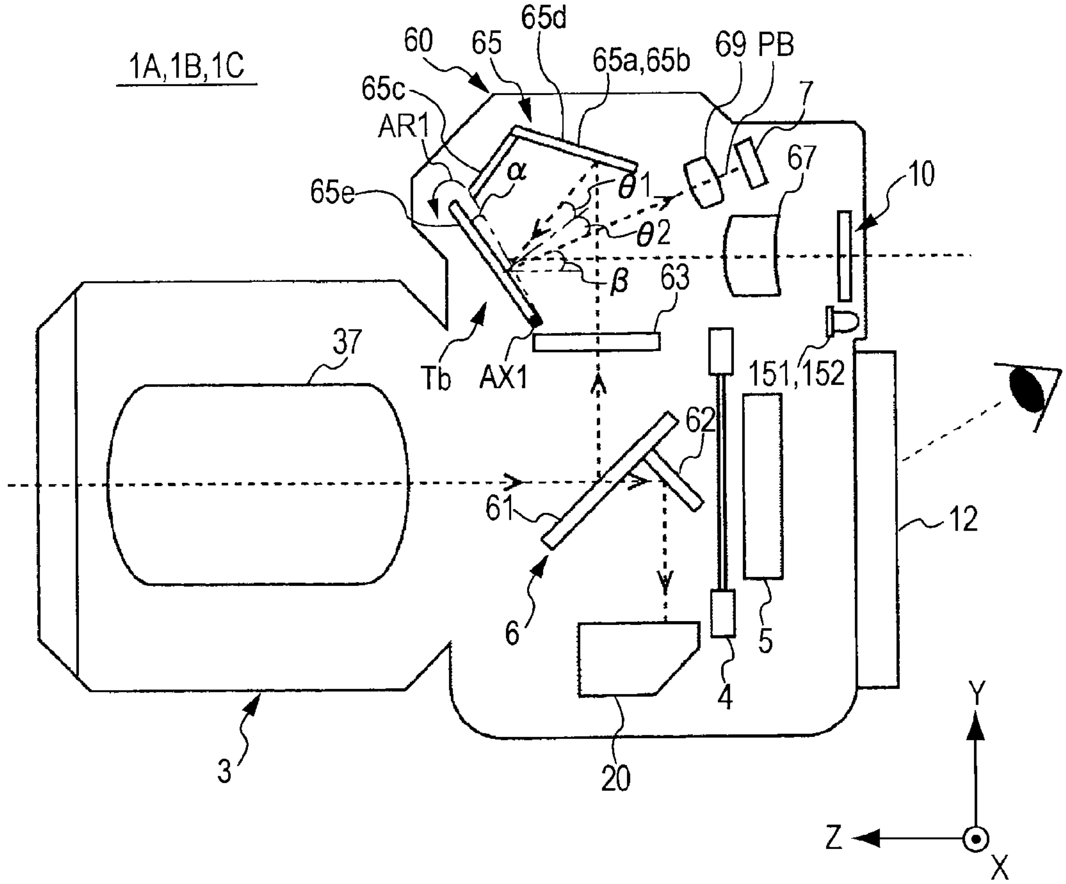
FIG. 7 a sectional view showing composition setting operation using an electronic viewfinder.

FIGS. 6 and 7 are sectional views of the image pickup apparatus 1A. FIG. 6 shows a composition setting operation using an optical viewfinder, and FIG. 7 shows a composition setting operation using an electronic viewfinder.

As shown in FIGS. 6 and 7, the mirror mechanism 6 is disposed on a light path (image-taking light path) extending from the interchangeable lens unit 3 to the image pickup device 5. The mirror mechanism 6 includes a main mirror 61 (main reflection surface) that upwardly reflects light from the image-taking optical system. For example, all or a part of the main mirror 61 is made of a half mirror so that a part of light from the image-taking optical system passes through the main mirror 61. The mirror mechanism 6 also includes a submirror 62 (sub-reflection surface) that downwardly reflects light that has passed through the main mirror 61. Light that has been reflected downward by the submirror 62 is guided toward an AF module 20 and enters the AF module 20, so that the light is used for an AF operation by a phase difference method.

Until a user depresses the release button 11 to the fully depressed state S2 in a shooting mode, in other words, while a user is trying to set the composition, the mirror mechanism 6 is disposed in a mirror-down state (see FIGS. 6 and 7). In this state, an object image from the interchangeable lens unit 3 is upwardly reflected by the main mirror 61 and enters a pentagonal mirror 65 as a monitor light beam. The pentagonal mirror 65 includes a plurality of mirrors (reflection surfaces) so as to adjust the orientation of the object image can be adjusted. The path of the monitor light beam after the monitor light beam has entered the pentagonal mirror 65 depends on whether a user sets the composition using an optical viewfinder or using an electronic viewfinder. This is described below.

When a user depresses the release button 11 to the fully depressed state S2, the mirror mechanism 6 is driven to be in a mirror-up state, the shutter 4 is opened, so that an exposure operation is started. The operation for capturing a still image of an object to be recorded (that is, an exposure operation) is the same for the two methods of setting the composition (a method of using an optical viewfinder and a method of using an electronic viewfinder).

Composition Setting Operation Using Optical Viewfinder

Next, composition setting operations using respective methods are described.

First, a composition setting operation using an optical viewfinder is described.

As shown in FIG. 6, when the main mirror 61 and the submirror 62 of the mirror mechanism 6 are disposed on the light path of an object image from the interchangeable lens unit 3, the object image is guided to the viewfinder window 10 via the main mirror 61, the pentagonal mirror 65, and an ocular lens 67. The optical viewfinder includes a viewfinder optical system 60 that includes the main mirror 61, the pentagonal mirror 65, and the ocular lens 67. The viewfinder optical system 60 guides a monitor light beam, which has been passed through the lenses (image-taking optical system) 37 and has been reflected by the main mirror (main reflection surface) 61, to the viewfinder window 10.

To be precise, light from the interchangeable lens unit 3 is reflected by the main mirror 61 and deflected upward, and forms an image on focusing glass 63, and passes through the focusing glass 63. After passing through the focusing glass 63, the light is deflected by the pentagonal mirror 65, and the light passes through the ocular lens 67 toward the viewfinder window 10 (see the light path shown in FIG. 6). Thus, the object image passes through the viewfinder window 10, reaches an eye of a user (observer), and the user recognizes the object image. That is, the user can check the object image through the viewfinder window 10.

The pentagonal mirror 65 includes two mirrors (roof mirrors) 65*a* and 65*b* having a delta-roof shape, a surface 65*c* fixed to the roof mirrors (roof surfaces) 65*a* and 65*b*, and a mirror (hereinafter referred to as a "movable mirror") 65*e* that can be rotated around an axis AX1 by turning the switching dial 87. The two delta-shaped roof mirrors 65*a* and 65*b* are formed as an assembly 65*d* by plastic molding. The light, which has been reflected by the main mirror 61 and deflected upward, is reflected by the roof mirrors 65*a* and 65*b* so as to be horizontally flipped, and reflected by the movable mirror 65*e* so as to be vertically flipped, then reaches an eye of a user. As described above, the image, which has been horizontally and vertically flipped by the interchangeable lens unit 3, is again horizontally and vertically flipped by the pentagonal mirror 65. Therefore, a user can observe an object image, which has the same orientation as the real object, with an optical viewfinder.

The light, which has passed through the main mirror 61, is reflected by the submirror 62, is deflected downward, and enters the AF module 20. The AF module 20 performs a distance-measuring operation using the light that has reached the AF module 20 via the main mirror 61 and the submirror 62.

Composition Setting Operation Using Electronic Viewfinder

Next, a composition setting operation using an electronic viewfinder is described.

Also in this case, as shown in FIG. 7, the main mirror 61 and the submirror 62 of the mirror mechanism 6 are disposed on a light path of an object image from the interchangeable lens unit 3. Light from the interchangeable lens unit 3 is reflected by the main mirror 61 and deflected upward, forms an image on the focusing glass 63, and passes through the focusing glass 63.

However, in the composition setting operation using an electronic viewfinder, the light, which has passed through the focusing glass 63, is deflected by the pentagonal mirror 65, passes through an image-forming lens 69 (image-forming optical system), and again forms an image on an image pickup surface of the image pickup device 7 (see light path PB shown in FIG. 7). The light, which has been reflected by the main mirror 61 and deflected upward, is reflected by the roof mirrors 65*a* and 65*b* so as to be horizontally flipped. Then, the light is again reflected by the movable mirror 65*e* so as to be vertically flipped, is horizontally and vertically flipped by the image-forming lens 69, and reaches the image pickup device 7.

To be specific, as compared with FIG. 6, the angle of the movable mirror 65*e* (the angle relative to the camera body 2) is changed in FIG. 7. To be more specific, from the state shown in FIG. 6, the movable mirror 65*e* is rotated by an angle $\alpha$ around an axis AX1 in the direction of an arrow AR1. That is, the position of the movable mirror 65*e* can be switched from a position Ta shown in FIG. 6 to a position Tb shown in FIG. 7. With the position Ta, a light beam (monitor light beam), which has been reflected by the main mirror 61, is deflected toward the viewfinder window 10. With the position Tb, the monitor light beam is deflected toward the image pickup device 7.

By changing the position of the movable mirror 65*e*, the reflection angle of light (monitor light beam) reflected by the movable mirror 65*e* can be changed, so that the direction of light reflected by the movable mirror 65*e* can be changed. To be specific, as compared with the state shown in FIG. 6, the incident angle $\theta$1 to the movable mirror 65*e* is comparatively small, and the reflection angle $\theta$2 is also comparatively small. As a result, the light path of the reflection light from the movable mirror 65*e* is upwardly deflected from a light path oriented toward the ocular lens 67 to a light path closer to the roof mirrors 65*a* and 65*b*, so that the light passes through the image-forming lens 69 and reaches the image pickup device 7. The image-forming lens 69 and the image pickup device 7 are disposed above the ocular lens 67 at a position that does not block the light beam passing from the movable mirror 65*e* toward the ocular lens 67 while the optical viewfinder is being used.

When the movable mirror 65*e* is moved by an angle $\alpha$, the light beam is reflected by an angle $\beta$ (=2×$\alpha$) by the movable mirror 65*e*. To put it differently, in order to change the angle of the reflection light by an angle $\beta$, it is sufficient to rotate the movable mirror 65*e* by an angle $\alpha$ that is half the angle $\beta$. Thus, with a comparatively small rotation angle of the movable mirror 65*e*, the direction of reflection light from the movable mirror 65*e* can be changed by a comparatively large angle. Moreover, since the movable mirror 65*e* and the image pickup device 7 are comparatively far from each other, reflection light from the movable mirror 65*e* can be directed toward the ocular lens 67 and the image pickup device 7, which are far from each other, by slightly changing the rotation angle of the movable mirror 65*e*. In short, by slightly changing the rotation angle of the movable mirror 65*e*, a reflection light beam from the movable mirror 65*e* can be selectively oriented along one of the two light paths. Thus, the movable mirror 65*e* can be rotated with a minimum additional space.

The image pickup device 7 generates a live image on the basis of an object image that has reached the image pickup device 7 after being reflected by the movable mirror 65*e* and passed through the image-forming lens 69. To be specific, the image pickup device 7, while receiving a light beam (monitor light beam) reflected by the main mirror 61, successively generates a plurality of image signals with a short interval (for example, 1/60 seconds). The captured time-series image signals are successively displayed (live view displayed) on the back side monitor 12. Thus, a user can set the composition by using a moving image while watching the moving image displayed on the back side monitor 12.

Also in this case, as in the composition setting operation using an optical viewfinder (see FIG. 6), an AF operation is performed by using light that has entered the AF module 20 via the main mirror 61 and the submirror 62.

As described above, by changing the reflection angle of the movable mirror 65*e*, the direction of the monitor light beam, which has been reflected by the movable mirror 65*e*, can be switched between the light path PA (FIG. 6), which is directed from the movable mirror 65*e* to the ocular lens 67 and the viewfinder window 10, and the light path PB (FIG. 7), which is directed from the movable mirror 65*e* to the image-forming lens 69 and the image pickup device 7. In other words, by changing the reflection angle of the movable mirror 65*e*, the direction of the monitor light beam can be switched between the first light path PA in which light is reflected by the movable mirror 65*e* toward the viewfinder window 10 and the second light path PB in which light is reflected by the movable mirror 65*e* toward the image pickup device 7.

In the image pickup apparatus 1A, among the mirrors 65*a*, 65*b*, and 65*e* of the pentagonal mirror 65, the reflection angle of one reflection surface (the movable mirror 65*e*) is changed, while the other reflection surfaces (the roof mirrors 65*a* and 65*b*) are fixed. That is, the direction of the monitor light beam can be changed by driving only one reflection surface (the movable mirror 65*e*) among the reflection surfaces, so that a compact structure having a small number of driving members can be provided. In the image pickup apparatus 1A, among the reflection surfaces of the pentagonal mirror 65 of the viewfinder optical system 60, the reflection angle of the movable mirror 65*e*, which is different from the reflection surfaces of the roof mirrors 65*a* and 65*b*, is changed so as to change the direction of the monitor light beam. With this structure, the direction of the monitor light beam can be more easily changed than by driving the roof mirrors 65*a* and 65*b*.

When a user of the image pickup apparatus 1A wants to set the composition using an electronic viewfinder, the movable mirror 65*e* is set in the position Tb shown in FIG. 7. In this case, the light path PB directed toward the image pickup device 7 is selected, and the back side monitor 12 is turned on (to be in a display state) so that live view display on the basis of an image signal captured by the image pickup device 7 can be performed.

On the other hand, when a user wants to set the composition using an optical viewfinder, the movable mirror 65*e* is set in the position Ta shown in FIG. 6. In this case, the light path PA directed toward the viewfinder window 10 is selected.

Specific operations of the image pickup apparatus 1A having the above-described structure is described below.

Operation of Image Pickup Apparatus 1A

Figure 8:
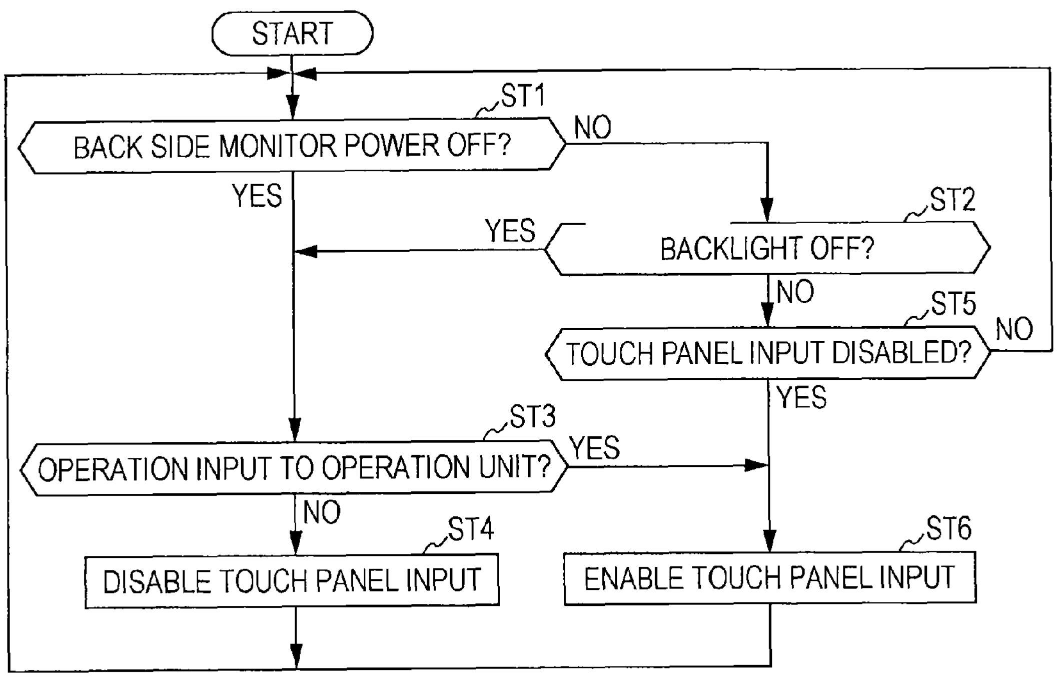
FIG. 8 is a flowchart illustrating a fundamental operation of the image pickup apparatus.

FIG. 8 is a flowchart illustrating a fundamental operation of the image pickup apparatus 1A. This is a control operation related to touch panel input, which is performed by the overall controller 101A.

When a user turns on the main switch 81 so as to activate the image pickup apparatus 1A, the overall controller 101A determines whether the back side monitor 12 is turned off (step ST1). That is, the overall controller 101A determines whether the power for the back side monitor 12 is off and the back side monitor 12 is in an inactive state (unused state). If the back side monitor 12 is turned off, the control passes to step ST3. If the back side monitor 12 is not turned off, the control passes to step ST2.

In step ST2, the overall controller 101A determines whether the backlight 128 is turned off. That is, the overall controller 101A determines whether the power for the backlight 128 is off and the back side monitor 12 is in an inactive state. If the backlight 128 is turned off, the control passes to step ST3. If the backlight 128 is not turned off, the control passes to step ST5.

With the operations in steps ST1 and ST2, when the back side monitor 12 is in an inactive state, the touch panel input controller 112A normally sets touch panel input to a disable state in step ST4 described below so as to effectively suppress unintended input in a situation where touch panel input is not necessary.

In step ST3, the overall controller 101A determines whether there is operation input to the operation section 80. To be specific, the overall controller 101A determines whether operation input by a user is detected on any of operation members of the operation section 80. If operation input on the operation section 80 is detected, the process passes to step ST6. If operation input is not detected, the control passes to step ST4.

With the processing in step ST3, when the back side monitor 12 enters an inactive state and the touch panel input controller 112A sets the touch panel to an input disable state, if a user operation is detected in the operation section 80 disposed in a position different from the position of the touch panel 129, the touch panel is switched to an input enable state. Thus, the touch panel can be resumed to an input enable state at an appropriate timing.

In step ST4, touch panel input is disabled. That is, the touch panel input controller 112A disables user input to the touch panel 129.

In step ST5, whether touch panel input is in a disable state is determined. That is, after user input to the touch panel 129 has been set to a disable state in step ST4, whether the state has been maintained is determined. If touch panel input is in a disable state, the control passes to step ST6. If touch panel input is not in a disable state, the control returns to step ST1.

In step ST6, touch panel input is enabled. That is, the touch panel input controller 112A enables user input to the touch panel 129. In this case, in order to receive touch panel input, the power for the back side monitor 12 and the backlight 128 is turned on so as to clear the inactive state of information display on the back side monitor 12.

With the above-described operation of the image pickup apparatus 1A, touch panel input can be disabled in an inactive state of the back side monitor 12 in which touch panel input does not have to be received. Moreover, if there is operation input on the operation section 80 in the inactive state, touch panel input is enabled in response to the operation input. Thus, unintended input on the touch panel can be appropriately suppressed.

In the image pickup apparatus 1A, it is not necessary that touch panel input be enabled when there is a user operation on any of the operation members in the operation section in step ST3 (and step ST6). Touch panel input may be enabled only when there is a user operation on a specific operation member (for example, the release button 11 or the playback button 85) in the operation section 80. Alternatively, touch panel input may be enabled when there is detection by the detection unit 13 disposed in a position different from the position of the touch panel 129, for example, when the grip detector 16 detects that a user holds the grip 14. This configuration also allows touch panel input to be resumed to an enable state at an appropriate timing.

It the image pickup apparatus 1A, the condition for disabling touch panel input may not be the case when the power for the back side monitor 12 is turned off or the backlight 128 is off. Touch panel input may be disabled when the back side monitor 12 is in a stand-by state, in which the entire liquid crystal panel 127 is in a light shielding state and whereby the LCD 126 is in a black display state.

Second Embodiment

An image pickup apparatus 1B according to a second embodiment of the present invention has a structure similar to that of the image pickup apparatus 1A according to the first embodiment shown in FIGS. 1, 2, and 5, except that the structure of the overall controller is different.

An overall controller 101B of the image pickup apparatus 1B is configured such that a control program for performing an operation of the image pickup apparatus 1B is stored in a touch panel input controller 112B.

Operation of Image Pickup Apparatus 1B

In the image pickup apparatus 1A of the first embodiment, as in steps ST1 and ST2 shown in FIG. 8, when power for the back side monitor 12 is turned off or the backlight 128 is off, touch panel input is forcibly set to a disable state on condition that there is no operation input to the operation section 80. In other words, the condition for enabling touch panel input fixedly includes a case when the power for the back side monitor 12 is turned on and a case when the backlight 128 is turned on.

In contrast to the image pickup apparatus 1A, the image pickup apparatus 1B of the second embodiment allows a user to customize the condition for enabling touch panel input so as to improve usability. Specific operations of the image pickup apparatus 1B is described below.

Figure 9:
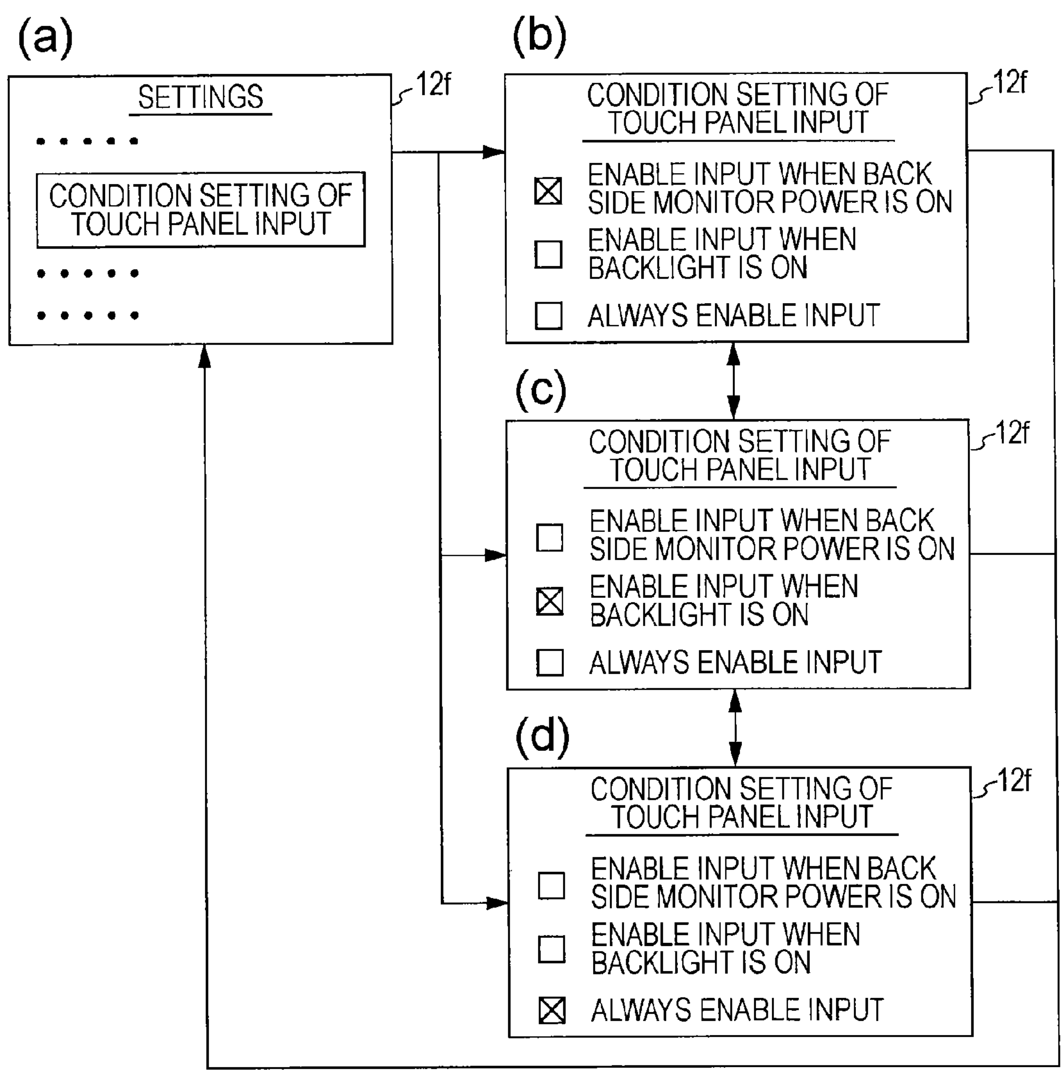
FIG. 9 is an explanatory diagram of a fundamental operation of an image pickup apparatus according to a second embodiment of the present invention.

FIG. 9 is an explanatory diagram of a fundamental operation of the image pickup apparatus 1B. This operation is performed by the overall controller 101B so as to set the condition for enabling touch panel input.

When a user of the image pickup apparatus 1B turns the mode setting dial 82 and selects a mode for performing various setting of the image pickup apparatus 1B, a menu screen as shown in part (a) of FIG. 9 is displayed on the display screen 12*f* of the back side monitor 12. When the user operates the touch panel 129 and selects a menu item "Condition Setting of Touch Panel Input" on the menu screen, a condition for enabling touch panel can be selected among the options including enabling input when the back side monitor 12 is turned on, enabling input when the backlight 128 is turned on, and always enabling input.

To be specific, when a user selects a menu item "Enable Input When Back Side Monitor is On" as shown in part (b) of FIG. 9, user input using the touch panel 129 is enabled only when the power for the back side monitor 12 is on.

When a user selects a menu item "Enable Input When Backlight is On" as shown in part (c) of FIG. 9, user input using the touch panel 129 is enabled only when the backlight 128 on.

When a user selects a menu item "Always Enable Input" as shown in part (d) of FIG. 9, user input using the touch panel 129 is always enabled irrespective of whether the power for the back side monitor 12 and the backlight 128 are on or off.

When a switching condition for switching between a touch panel input enable state and a touch panel input disable state on the basis of operation input using the touch panel 129 is set, information of the switching condition that has been set is stored, for example, in a flash memory of the overall controller 101B. Thus, the touch panel input controller 112B can control touch panel input on the basis of the information of the switching condition that has been customized by a user and stored in the memory.

With the above-described operation of the image pickup apparatus 1B, a condition for switching between a touch panel input enable state and a touch panel input disable state can be customized. Therefore, unintended input using the touch panel is appropriately suppressed unless a touch panel input enable condition set by a user is satisfied.

Third Embodiment

An image pickup apparatus 1C according to a third embodiment of the present invention has a structure similar to that of the image pickup apparatus 1A according to the first embodiment shown in FIGS. 1, 2, and 5, except that the structure of the overall controller is different.

That is, in an overall controller 101C of the image pickup apparatus 1C, a control program for performing an operation of the image pickup apparatus 1C as described below is stored in a touch panel input controller 112C.

Operation of Image Pickup Apparatus 1C

In the image pickup apparatus 1A of the first embodiment, as shown in steps ST1 and ST2 of FIG. 8, when the power for the back side monitor 12 if off or the backlight 128 is off, touch panel input is set to a disable state on condition that no operation input is performed using the operation section 80.

Figures 10, 11:
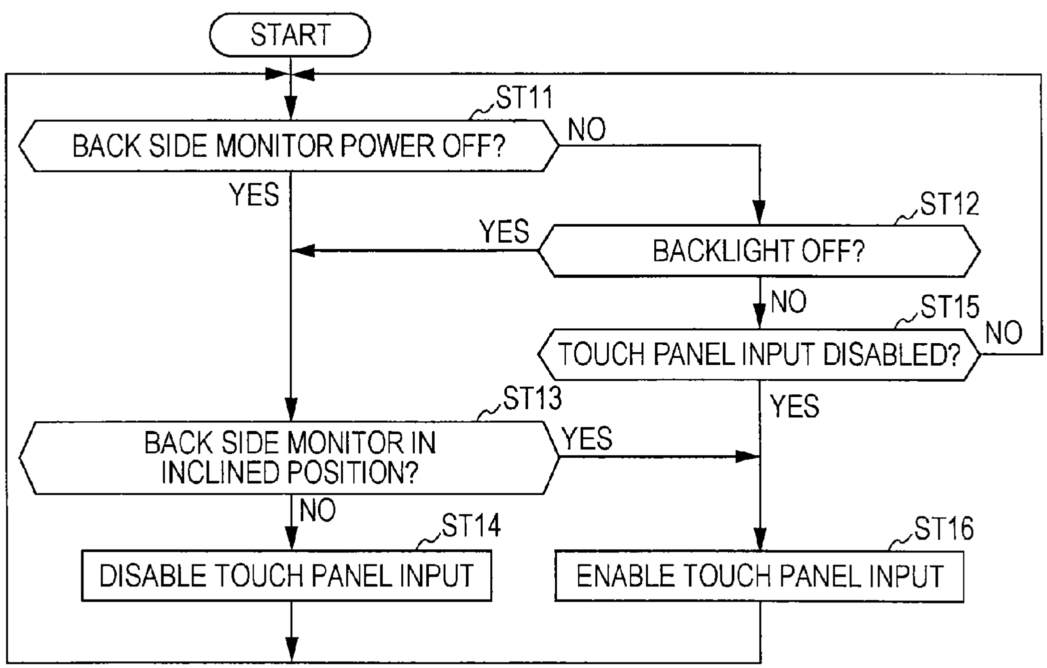
FIG. 10 is a table used for explaining a touch panel input control operation of an image pickup apparatus according to a third embodiment of the present invention.
FIG. 11 a flowchart illustrating a fundamental operation of the image pickup apparatus.

In contrast to the image pickup apparatus 1A, the image pickup apparatus 1C of the third embodiment is configured such that, even when the power for the back side monitor 12 is off or the backlight 128 is off, touch panel input is enabled or disabled in accordance with the position of the back side monitor 12. To be specific, the overall controller 101C stores a data table as shown in FIG. 10 and controls touch panel input on the basis of the data table. Operation of the image pickup apparatus 1C is described in detail below.

FIG. 11 a flowchart illustrating a fundamental operation of the image pickup apparatus 1C. The flowchart shows touch panel input control, which is performed by the overall controller 101C on the basis of the data table shown in FIG. 10.

In steps ST11 and ST12, operation similar to that of steps ST1 and ST2 as shown in the flowchart of FIG. 8 is performed.

In step ST13, whether the back side monitor 12 is in an inclined position is determined. To be specific, whether the display screen 12*f* of the back side monitor 12 is in the inclined position Qa or Qb as shown in FIGS. 3A and 3B is determined using the monitor position detector 17. If the back side monitor 12 is in an inclined position, the overall controller 101C determines that a user wants to use the back side monitor 12 including the touch panel 129, and the process passes to step ST16 so as to enable touch panel input. On the other hand, if the back side monitor 12 is not in an inclined position but in the normal position Qo (shown by a two-dot chain line in FIG. 3A), the process passes to step ST14 so as to disable touch panel input.

In steps ST14 to ST16, an operation similar to that of steps ST4 to ST6 as shown in the flowchart of FIG. 8 is performed.

With such operation of the image pickup apparatus 1C, touch panel input can be switched between an enable state and a disable state in accordance with the position of the display screen 12*f* detected by the monitor position detector 17, so that unintended input to the touch panel can be appropriately suppressed.

In the image pickup apparatus 1C, it is not necessary that touch panel input be enabled when the back side monitor 12 is in an inclined position in a state in which the power for the back side monitor 12 is off or the backlight 128 is off. Alternatively, the condition for enabling touch panel input may be customizable as in the second embodiment. This operation is specifically described below.

Figure 12:
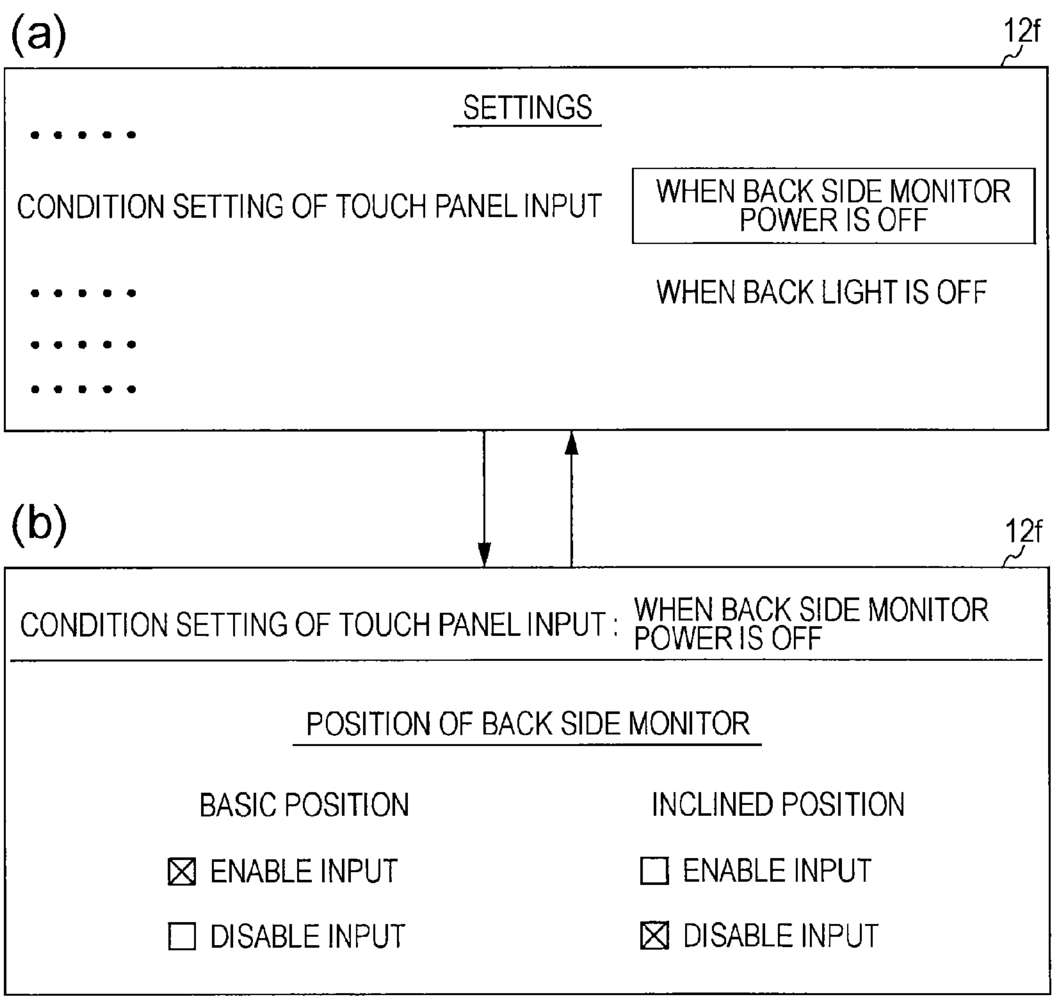
FIG. 12 is an explanatory diagram of an operation related to touch panel input condition setting.

FIG. 12 is an explanatory diagram of an operation related to touch panel input condition setting.

When a user turns the mode setting dial 82 and selects a setting mode for setting various setting of the image pickup apparatus, a menu screen as shown in part (a) of FIG. 12 is displayed on the display screen 12*f* of the back side monitor 12. On the menu screen, when a user operates the touch panel 129 and selects "When Back Side Monitor Power is Off" on the menu "Condition Setting of Touch Panel Input", touch panel input can be disabled and enabled in accordance with the position of the back side monitor 12 when the power for the back side monitor 12 is off.

To be specific, as shown in part (b) of FIG. 12, for each position of the back side monitor 12 (normal position and inclined position), a switching condition for enabling or disabling user input to the touch panel 129 can be set. Once the switching condition of touch panel input is set, the switching condition is stored in the overall controller 101C by overwriting the data table (see FIG. 10).

With the above-described operation, switching condition for switching between an touch panel enable state and a touch panel disable state can be customized in accordance with the position of the back side monitor 12. Thus, touch panel input condition can be set as a user desires.

The monitor position detector 17 of the image pickup apparatus 1C may detect whether the back side monitor 12 is in an inclined position by the following method.

Figure 13:
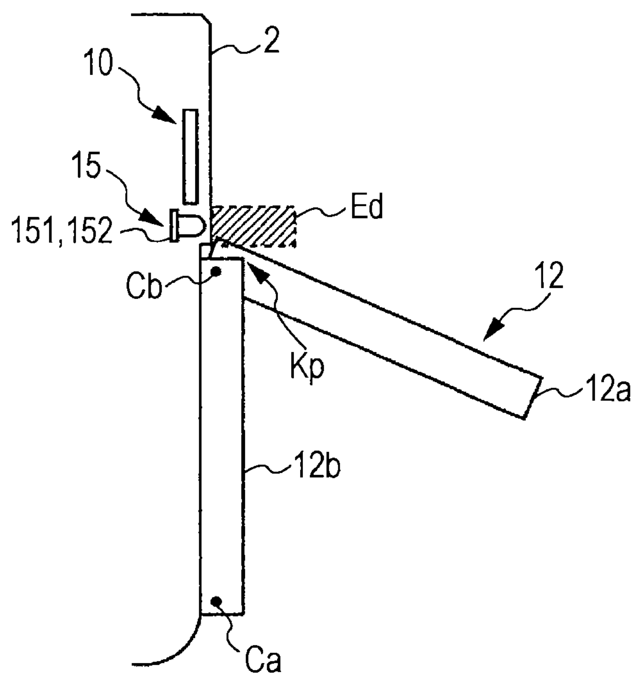
FIG. 13 is an explanatory view showing an alternative method for detecting the position of a back side monitor.

FIG. 13 is an explanatory view showing another method for detecting the position of the back side monitor 12.

Regarding the eye detector 15, a region Ed capable of detecting a user's eye (eye detection region, which is shown by a shaded area in FIG. 13) is defined. The eye detection region extends toward the back of the camera body 2. When the monitor body 12*a* is in an inclined position as shown in FIG. 13, a portion Kp (corner) of the monitor body 12*a* enters the eye detection region Ed, and the eye detector 15 detects the portion Kp. Thus, the monitor position detector 17, which receives the detection result from the eye detector 15, can detect whether the back side monitor 12 is in an inclined position.

MODIFICATION

It is not necessary that the above-described embodiments be configured as digital cameras. They may be configured as film cameras.

It is not necessary that the above-described embodiments be configured as image pickup apparatuses. They may be configured as information processing apparatuses (electronic apparatuses) with touch panel monitors, such as PDAs or portable terminals. In such cases, unintended input using a touch panel can be appropriately suppressed by disabling touch panel input when, for example, the power for the monitor is off.

It is not necessary, in the above-described embodiments, that the touch panel 129 be disposed on the back side monitor 12 of the image pickup apparatus. A touch panel be disposed on a monitor that is detachably connected to the image pickup apparatus through a connector or the like.

It is not necessary, in the above-described embodiments, that detection of a touch position be detected using a touch panel. For example, a touch position may be optically detected by detecting a position at which a light beam is blocked. The light beam may be an infrared or other light beam passing in a grid-like manner over a display screen, or a light beam scanning on a display screen.

The present application contains subject matter related to that disclosed in Japanese Priority Patent Application JP 2008-207896 filed in the Japan Patent Office on Aug. 12, 2008, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. An information processing apparatus, comprising:

display circuitry, including a display screen, configured to perform information display and switch between an inactive state and an active state with respect to the information display;

touch input operation circuitry configured to operate in at least two touch states including a touch input enable state and a touch input disable state, the touch input enable state being a state in which a predetermined processing is performed in response to a touch position detected by a touch position detector disposed on the display screen, the touch input disable state being a state in which no processing is performed in response to the touch position detected by the touch position detector, the touch input enable state and the touch input disable state being switchable; and detector circuitry configured to detect at least two predetermined states, of the information processing apparatus, including a first predetermined state in which the display screen is powered on and the touch input operation circuitry is operating in the touch input enable state, and a second predetermined state in which the display screen is powered off and the touch input operation circuitry is operating in the touch input disable state, wherein the touch input operation circuitry operates, responsive to a setting set based on user input, in the touch input disable state when the display screen is powered off and in an inclined position, the inclined position being determined based on detecting only a portion of the display screen, by eye detection circuitry, in an eye detection region, and the touch input operation circuitry operates, responsive to the setting set based on the user input, in the touch input enable state when the display screen is powered off and in an upright position, the upright position being determined when the eye detection circuitry does not detect the inclined position.

2. The information processing apparatus according to claim 1, wherein the touch input operation circuitry switches to the touch input disable state when the display circuitry enters the inactive state.

3. The information processing apparatus according to claim 1, wherein the touch input operation circuitry switches to the touch input enable state when the display circuitry enters the active state.

4. An information processing displaying method for operating an information processing apparatus, comprising:

operating, by a display circuitry including a display screen that performs information display, in at least one of an inactive state and an active state with respect to the information display;

detecting, by a detector disposed on the display screen, a touch position;

operating in at least one of two touch states including a touch input enable state and a touch input disable state, by a touch input operation circuitry, the touch input enable state being a state in which a predetermined processing is performed in response to the touch position detected by the touch position detector disposed on the display screen, the touch input disable state being a state in which no processing is performed in response to the touch position detected by the touch position detector, the touch input enable state and the touch input disable state being switchable;

detecting at least one of two predetermined states of the information processing apparatus, by a detector, including a first predetermined state in which the display screen is powered on and the touch input operation circuitry is operating in the touch input enable state, and a second predetermined state in which the display screen is powered off and the touch input operation circuitry is operating in the touch input disable state; and performing the predetermined processing in response to the touch position detected by the touch detector disposed on the display screen when the first predetermined state is detected, wherein the touch input operation circuitry operates, responsive to a setting set based on user input, in the touch input disable state when the display screen is powered off and in an inclined position, the inclined position being determined based on detecting only a portion of the display screen, by eye detection circuitry, in an eye detection region, and the touch input operation circuitry operates, responsive to the setting set based on the user input, in the touch input enable state when the display screen is powered off and in an upright position, the upright position being determined when the eye detection circuitry does not detect the inclined position.

5. The information processing displaying method according to claim 4, further comprising: switching, by the touch input operation circuitry, to the touch input disable state when the display circuitry enters the inactive state.

6. The information processing displaying method according to claim 4, further comprising:

switching, by the touch input operation circuitry, to the touch input enable state when the display circuitry enters the active state.

* * * * *